United States Patent [19]
Lang, Jr. et al.

[11] 3,863,010

[45] Jan. 28, 1975

[54] COMPOSITIONS OF MATTER AND METHOD OF USE OF PHENYL AND SUBSTITUTED PHENYL TETRAZINES

[75] Inventors: Stanley Albert Lang, Jr., Pomona; Elliott Cohen, Pearl River; Adolph Edward Sloboda, New City, all of N.Y.

[73] Assignee: American Cyanamid Company, Stamford, Conn.

[22] Filed: Sept. 28, 1973

[21] Appl. No.: 401,929

[52] U.S. Cl. .............................................. 424/244
[51] Int. Cl. .......................................... A61k 27/00

[58] Field of Search .................................. 424/244

[56] References Cited
OTHER PUBLICATIONS
Chem. Abst., 52 – 20190–20191.

Primary Examiner—Stanley J. Friedman
Attorney, Agent, or Firm—Ernest Y. Miller

[57] ABSTRACT

Compositions of matter and method of use of phenyl or substituted phenyltetrazines are described. These compounds are useful for the relief of inflammation and pain in warm-blooded animals.

10 Claims, No Drawings

COMPOSITIONS OF MATTER AND METHOD OF USE OF PHENYL AND SUBSTITUTED PHENYL TETRAZINES

DESCRIPTION OF THE INVENTION

This invention relates to composition of matter and method of treatment for the relief of inflammation and pain in warm-blooded animals. It relates specifically to the administration of an effective amount of a select group of phenyltetrazines represented by formula I.

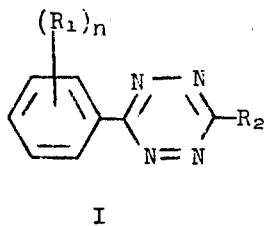

I wherein $R_1$ is lower alkyl, halogen, hydroxy, lower alkoxy or trifluoromethyl; $R_2$ is hydrogen or methyl, and $n$ is 0–2. The term lower alkyl and lower alkoxy includes those having one through four carbon atoms. The term halogen includes chlorine, bromine, fluorine or iodine.

These active components, known previously or related to known compounds, are prepared by the following reaction sequence:

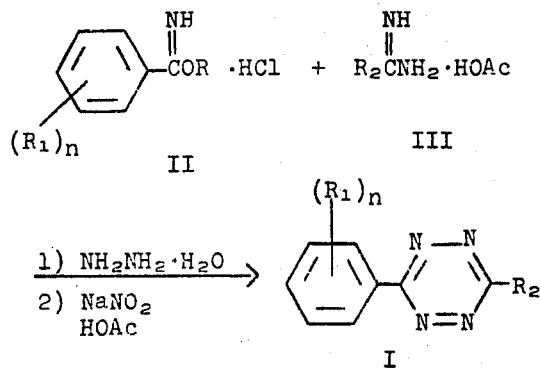

wherein R is lower alkyl and $R_1$, $R_2$ and n are as defined above.

The starting iminobenzoates, (II), are usually prepared from the corresponding nitriles by the Pinner reaction (acid-catalyzed addition of alcohols to nitriles). In some cases it is advantageous to react the appropriate aryl amide or nitrile with methyl fluorosulfonate to "activate" the group for subsequent treatment with an amidine acetate, (III). The reaction of (II) and (III) is usually performed with hydrazine hydrate as the solvent and run for 2 to 4 hours at room temperature. The mixture is usually poured into water, filtered and the solid treated with nitrite and acetic acid. The desired tetrazine is isolated after 15–30 minutes by pouring into water and filtering (if a solid) or extracting with chloroform (if an oil) and evaporating to dryness. To purify the product, ethylacetate, hexane or the like are suitable solvents for recrystallization, or chromatography on silica gel, eluting with methylene chloride, preceding recrystallization, is used where needed.

The compounds of this invention have been found useful in doses which range from about 1 to 250 mg./kg./day of a warm-blooded animal. The preferred range of dose is usually from 10–75 mg./kg./day. The daily dosage may be administered in dosage units which may vary from 200 to 2,000 milligrams.

In determining the acute antiinflammatory activity of the present compounds, Royal Hart, Wistar strain rats ranging from 80 to 90 g. are used. The rats are fasted overnight prior to dosing but had free access to water. The drugs in aqueous suspension are administered by gavage in a volume of 1.7 ml./50 g. rat (corresponds to hydration volume used by Winter et al., Proc. Soc. Exp. Biol. & med. 111, 544–547, 1962). The dosage of all compounds is 250 mg./kg.

The phlogistic agent used in carrageenin prepared as a sterile 1 percent suspension in 0.9 percent sodium chloride for routine testing. A volume of 0.05 ml. is injected through a 26 gauge needle into the plantar tissue of the right hind paw. Measurements are made 5 hours after drug administration (4 hours after carrageenin challenge).

Volumes of both the normal and carrageenin inflammed feet are determined. The difference between the two measurements is considered to be the increased edema due to the carrageenin administration. Results are expressed as a Control $(C)$/Treated $(T)$ efficacy ratio. (The ratio of mean edema volume of eight control rats over the mean edema volume of two treated rats). If the $C/T$ is equal or greater than 1.41, the test is repeated a second time. If the mean ratio of test 1 and 2 is equal or greater than 1.43, the compound is accepted as active. The following Table I summarizes the results.

TABLE I

| Carrageenin Induced Edema in the Rat | |
|---|---|
| Name | Mean C/T |
| 3-phenyl-s-tetrazine | 2.93 |
| 3-(p-chlorophenyl)-s-tetrazine | 3.07 |
| 3-(p-chlorophenyl)-6-methyl-s-tetrazine | 2.60 |
| 3-p-tolyl-s-tetrazine | 2.75 |
| 3-(p-fluorophenyl)-s-tetrazine | 2.79 |
| 3-methyl-6-p-tolyl-s-tetrazine | 2.31 |
| 3-($\alpha,\alpha,\alpha$-trifluoro-p-tolyl)-s-tetrazine | 2.52 |
| 3-(3-chloro-p-tolyl)-s-tetrazine | 2.25 |
| 3-($\alpha,\alpha,\alpha$-trifluoro-m-tolyl)-s-tetrazine | 4.06 |
| 3-(p-methoxyphenyl)-s-tetrazine | 2.88 |
| 3-methyl-6-($\alpha,\alpha,\alpha$-trifluoro-m-tolyl)-s-tetrazine | 2.50 |
| 3-(m-chlorophenyl)-s-tetrazine | 3.71 |
| 3-methyl-6-m-tolyl-s-tetrazine | 5.15 |
| 3-methyl-6-(3,4-xylyl)-s-tetrazine | 1.83 |
| 3-(3,4-dimethoxyphenyl)-s-tetrazine | 2.09 |

In order to test erythema in albino guinea pigs (Lederle breeding colony) they are depilitated on their flanks, the evening before testing, with a standard mixture of barium sulfide and gum acacia. On the morning of testing, groups of four guinea pigs are dosed by gavage at a dose of 250 mg./kg. 1 hour prior to ultraviolet exposure (−1 hour). At 0-hour they are restrained in a plastic container which allows exposure of 3 circular spots. They are then exposed to ultraviolet irradiation from a "Hanovia" Kromayer lamp model 10 for 60 seconds. At +1 and +4 hours the degree of erythema for each of the three sites is assessed according to the following scoring system: 0-no erythema, 0.5 incomplete circle or faint erythema and 1.0 complete circle of distinct erythema. Thus, the maximum score for each animal is 3.0. The following Table II summarizes the results with several representative compounds of this invention.

TABLE II

Ultraviolet Induced Erythema of the Guinea Pig

| Name | 1 Hour Score | 4 Hour Score | Decision |
|---|---|---|---|
| 3-phenyl-s-tetrazine | 0.0 | 1.0 | A* |
| 3-(p-chlorophenyl)-s-tetrazine | 0.6 | 2.6 | A* |
| 3-p-tolyl-s-tetrazine | 0.5 | 2.9 | A* |
| 3-(p-fluorophenyl)-s-tetrazine | 0.0 | 1.9 | A* |
| Control (historical) | 2.1 | 2.8 | |

A* = Active by Discriminant Function Analysis

Tests to show activity against chronic inflammation in adjuvant arthritis are carried out. Groups of three Royal Hart Wistar strain rats, weighing 200 ± 10 g. each are injected intradermally in the right hind paw with Freund's adjuvant (dried human tubercle bacilli in a mineral oil vehicle) at a dose of 2 mg./kg. of body weight. Test compound is administered orally in a 1.5 percent starch vehicle at the indicated dosage in mg./kg. of body weight once daily on days 0 through 13 post-challenge. Control rats are treated in a similar manner, but given starch vehicle instead of the test compound. On the 14th day post-challenge the diameter of the injected paw (primary lesion) is measured by micrometer caliper. From these measurements of inflamed paws a determination is made of the Relative Surface Area (R.S.A.). This is a ratio expressed as Mean Surface Area of paws of 3 treated rats/.Mean Surface Area of paws of 60 control rats. If the Relative Surface Area is equal to or less than 0.76 the compound is tested again. After the second test the Mean Relative Surface Area (R.S.A.) for the rat paws from both tests is calculated and if the Mean R.S.A. is equal to or less than 0.736 the compound is tested a third time and if the Mean R.S.A. of all 3 tests is less than 0.753 the compound is accepted as active. The results of testing representative compounds of this invention are shown in Table III.

TABLE III

Adjuvant Induced Arthritis in Rats

| Name | Dosage mg./kg. | Mean R.S.A* |
|---|---|---|
| 3-phenyl-s-tetrazine | 50 | 0.528 |
| 3-(p-chlorophenyl)-s-tetrazine | 50 | 0.544 |
| 3-p-tolyl-s-tetrazine | 100 | 0.556 |
| 3-(p-fluorophenyl)-s-tetrazine | 50 | 0.456 |
| 3-methyl-6-p-tolyl-s-tetrazine | 50 | 0.678 |

*Active compounds have a mean relative surface area (RSA) less than 0.753.

The compounds of the present invention are active analgesics when measured by the "writhing syndrome" test for analgesic activity as described by Siegmund, et al., *Proceedings of the Society for Experimental Biology and Medicine*, Vol. 95, p. 729 (1957), with modifications. This method is based upon the reduction of the number of writhes following the intraperitoneal injection of one mg./kg. of body weight of phenyl p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl p-quinone. The test compounds are administered orally at dosage of 200 mg./kg. to groups of two mice each 30 minutes before injection of the phenyl p-quinone. The total number of writhes exhibited by each group of mice is recorded for a 3 minute period commencing 15 minutes after injection of the phenyl p-quinone. A compound is considered active if it reduces the total number of writhes in two test mice from a control value of approximately 30 per pair to a value of 18 or less. The following Table IV summarizes the activity of representative compounds as active analgesics.

TABLE IV

Mouse Anti-writhing Test

| Name | No. of Writhes per 3 minute period | |
|---|---|---|
| | Pair 1 | Pair 2 |
| Aspirin* | 3 | 1 |
| 3-phenyl-s-tetrazine | 6 | 1 |
| 3-(p-chlorophenyl)-s-tetrazine | 16 | 5 |
| 3-p-tolyl-s-tetrazine | 10 | 4 |
| Controls* | 30 | 30 |

*Data for controls and aspirin are historical averages using many pairs of animals.

A more definitive test for analgesics is experiments conducted to determine analgesia by a modification of the method of Randall and Selitto [Arch. Int. Pharmacodyn. 111, 409–419 (1957)] in rats whose paws are made sensitive to pressure by the injection of a 20 percent aqueous suspension (0.1 ml.) of brewers' yeast into the plantar surface of the left hind paw. Constantly increasing force (16 grams/second) is applied to the swollen paw using an Analgesy Meter, Ugo Basile. The pressure is stopped when the animal responds (sudden struggle or vocalization). Control rats treated with the starch vehicle respond to a pressure or force of about 20 grams. Pressure-pain thresholds are recorded two hours after the brewers' yeast injection. The agents being tested are given at the same time as the yeast at a dosage of 200 mg./kg. The ratios of treated ($T$)/ control ($C$) reaction thresholds are calculated as estimates of analgesic efficacy and are recorded in Table V. A compound is considered an active analgetic if its $T/C$ ratio $\geq 1.5$.

TABLE V

Rat Paw Pain Test

| Name | T/C ratio |
|---|---|
| Starch (control) | 1 |
| Aspirin | 2.23 |
| 3-phenyl-s-tetrazine | 2.64 |
| 3-(p-chlorophenyl)-s-tetrazine | 3.05 |
| 3-p-tolyl-s-tetrazine | 1.87 |

The active components of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, or similar materials as non-toxic pharmaceutically acceptable diluents or carriers.

The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for usch enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warmblooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The preparation of active components of this invention along with compositions containing the latter will be described in greater detail in the following examples.

EXAMPLE 1

Preparations of s-tetrazine, 3-(p-chlorophenyl)

A suspension of 10 g. (0.053 mole) of ethyl p-chloroiminobenzoate hydrochloride and 15 g. (0.15 mole) of formamidine acetate in 35 ml. of hydrazine hydrate is stirred at room temperature for 2–3 hours. The yellow suspension is poured into 250 ml. of water and the resulting solid is collected by filtration and sucked as dry as possible. The damp solid is dissolved in 80 ml. of glacial acetic acid and placed in a cooling bath at 5°–10°c. Sodium nitrate (5 g.) is slowly added with vigorous stirring. After addition (10–15 min), the dark purple solution is poured into water (300 ml.) and the solid is collected and air dried.

The solid is chromatographed on silica gel, eluting with methylene chloride. The initial fraction yields 3,6-bis-(p-chlorophenyl)-s-tetrazine, melting point 228°–231°C. (220 mg.). The second fraction yields the desired material, 3-(p-chlorophenyl)-s-tetrazine, 4.5 g. (44.1%), melting point 164°–167°C.

Anal. Calcd. for $C_8H_5ClN_5$ (192.70): C, 49.88; H, 2.62; N, 29.09; Cl, 18.41. Found: C, 49.79; H, 2.71; N, 29.46; Cl, 18.52.

Further elution (methylene chloride — 5% methanol) gives a yellow solid (chloroform, melting point 180°–183°C. (-gas), which resolidified and then melts 278°–281°C. This is identified as sym-1,2-bis-(p-chlorobenziminoyl)-hydrazine.

In other experiments, a white material is eluted with 5% methanol-methylene chloride. This material, melting point 278°–281°C. is identified as 3,5-di-(p-chlorophenyl)-1,2,4-triazole.

EXAMPLE 2

Preparation of s-tetrazine, 3-(p-chlorophenyl)-6-methyl

A suspension of 10 g. (0.046 mole) of ethyl p-chloroiminobenzoate hydrochloride and 16.2 g. (0.138 mole) of acetamidine acetate is treated as in Example 1. Yield 2.8 g. (26.8%) melting point 143°–145°C.

Anal. Calcd. for $C_9H_7ClN_4$ (206.8): C, 52.31; H, 3.42; N, 27.11. Found: C, 52.16; H, 3.36; N, 26.73.

EXAMPLE 3

Preparation of s-tetrazine, 3-methyl-6-p-tolyl

A suspension of 4 g. (0.02 mole) of ethyl p-methyliminobenzoate hydrochloride and acetamidine acetate are treated as outlined in Example 1, except for the following change. The excess hydrazine hydrate is removed under reduced pressure and this residue dissolved in glacial acetic acid. The remaining steps follows as outlined in Example 1. Yield 780 mg. (20.6%), melting point 115°–118°C Anal. Calcd. for $C_{10}H_{10}N_4$ (186.21): C, 64.50; H, 5.41; N, 30.09. Found: C, 64.29; H, 5.61; N, 29.81.

EXAMPLE 4

Preparation of s-tetrazine, 3-phenyl

A suspension of ethyl iminobenzoate hydrochloride and formamidine acetate is treated with 15 ml. of 95% hydrazine. The reaction is definitely exothermic. The remaining procedures are performed as in Example 1. Yield 950 mg. (18%), melting point 126°–129°C.

EXAMPLE 5

Preparation of s-tetrazine, 3-(p-fluorophenyl)

A suspension of methyl p-fluoroiminobenzoate hydrochloride (6.5 g.) and formamidine acetate are treated as in Example 1 with the following deviation. After reaction with hydrazine hydrate, the entire reaction mixture is treated with glacial acetic acid. The remaining manipulations are as outlined. Yield 1.9 g. (32%), melting point 144°–146°c.

Anal. Calcd. for $C_8H_5FN_4$ (176.15): C, 54.54; H, 2.86; N, 31.81; F, 10.79. Found: C, 54.26; H, 2.86, N, 31.54; F, 10.99.

EXAMPLE 6

Preparation of s-tetrazine, 3-ethyl-6-p-tolyl

A suspension of methyl p-methyliminobenzoate (10 g., 0.054 mole) and propionamidine acetate are treated as in Example 1 with the following exception. The final addition of water gives an oil which is extracted with chloroform. Solvent removal gives a semi solid or oil which is chromatographed. Yield 1.65 g. (15%), melting point 44°–46°C.

Anal. Calcd. for $C_{11}H_{12}N_4$ (200.24): C, 65.95; H, 6.04; N, 27.98. Found: C, 66.05; H, 6.03; N, 27.90.

EXAMPLE 7

Preparation of s-tetrazine, 3-(m-chlorophenyl)-6-methyl

A suspension of methyl m-chloroiminobenzoate hydrochloride (15 g., 0.085 mole) and acetamidine acetate gives, under conditions in Example 1, a thick oily cake when first treated with water. This is separated by decantation and treated as in Example 6 or 1. Yield 2.2 g. (13%), melting point 79°–81°C.

Anal. Calcd. for $C_9H_7ClN_4$ (206.67): C, 52.32; H, 3.41; N, 27.11; Cl, 17.16 Found: c, 52.67; H, 3.40; N, 27.18; Cl, 16.91.

EXAMPLE 8

Preparation of s-tetrazine, 3-(m-methoxyphenyl)

A suspension of m-methoxybenzamide (25 g., 0.17 mole) in 50 ml. of methylene chloride and 35 ml. (excess) of methyl fluorosulfonate is allowed to stir at room temperature overnight. The excess solvent and reagent are removed under reduced pressure. The remaining residue is mixed well with formamidine acetate and placed in an ice bath. Hydrazine hydrate is cautiously added, the ice bath removed and the reaction handled as in Examples 7 or 1. Yield 5.4 g. (19%), melting point 96°–98°C.

Anal. Calcd. for $C_9H_8N_4O$ (188.18): C, 57.44; H, 4.28; N, 29.77. Found: C, 57.20; H, 4.43; N, 29.99.

EXAMPLE 9

Preparation of s-tetrazine, 3-methyl-6-m-tolyl

A solution of m-toluonitrile (10 g., 0.085 mole) in 50 ml. of methylene chloride and 15 ml. of methyl fluorosulfonate is stirred at room temperature overnight. The solvent and excess reagent are removed under reduced pressure. Acetamidine acetate is added and the components mixed well. The flask is placed in an ice bath and hydrazine hydrate is added with extreme caution as the reaction is highly exothermic. After all the hydrazine hydrate has been added, the cooling bath is removed and the sequence in Example 7 or 1 is resumed. Yield 400 mg. (2.5%).

Anal. Calcd. for $C_{10}H_{10}N_4$ (186.21): C, 64.50; H, 5.41; N, 30.09. Found: C, 63.99; H, 5.42; N, 29.92.

EXAMPLE 10

Preparation of s-tetrazine, 3-m-tolyl

The sequence is carried out as in Example 9 with the following adjustment. After removal under pressure of the solvent and excess methyl fluorosulfonate, the residue is redissolved in methylene chloride and placed in an ice bath. Methanol (5 ml.) is added dropwise.

The solvent is removed again under reduced pressure and the residue mixed with formamidine acetate and treated as outlined in Example 9. The exotherm, upon addition of hydrazine hydrate, is in this sequence, substantially lessened. Yield 1.2 g. (3.9%), melting point 75°–78°C.

Anal. Calcd. for $C_9H_8N_4$ (172.18): C, 62.78; H, 4.68; N, 32.54. Found: C, 62.48; H, 4.72; N, 32.35.

EXAMPLE 11

Preparation of s-tetrazine, 3-(α,α,α-trifluoro-p-tolyl)

This material is formed by the standard method (Example 1) in which methyl p-trifluoroiminobenzoate hydrochloride is used and yields 6.2 g. (67%) of brilliant carmine plates, melting point 138°–141°C.

Anal. Calcd. for $C_9H_5F_3N_4$ (226.16): C, 47.79; H, 2.23; N, 24.77; F. 25.20. Found: C, 48.02; H, 2.31; N, 24.78; F, 24.92.

EXAMPLE 12

Preparation of s-tetrazine, 3-(α, α, α-trifluoro-m-tolyl)

The above product is synthesized by following the procedure of Example 7 except that methyl m-trifluoroiminobenzoate hydrochloride is used, yield 2.3 g. (18.3%), melting point 60°–62°C.

Anal. Calcd. for $C_9H_5F_3N_4$ (226.16): C, 47.79; H, 2.23; N, 24.77; F, 25.26. Found; C, 47.60; H, 2.35; N, 24.91; F, 24.71.

EXAMPLE 13

Preparation of s-tetrazine, 3-methyl-6-(α, α, α-trifluoro-p-tolyl)

This product is prepared as outlined in Example 1, except that methyl-p-trifluoroiminobenzoate hydrochloride is used, yield 3.8 g. (36%), melting point 164°–165°C.

Anal. Calcd. for $C_{10}H_7F_3N_4$ (240.19): C, 50.00; H, 2.94; N, 23.33; F, 23.73. Found: C, 50.25; H, 2.94; N, 22.94; F, 23.85.

EXAMPLE 14

Preparation of s-tetrazine, 3-methyl-6-(α, α, α-trifluoro-m-tolyl

This product is prepared as outlined in Example 7, except that methyl m-trifluoromethyliminobenzoate hydrochloride is used, yield 3.2 g. (31%), melting point 46°–48°C.

Anal. Calcd. for $C_{10}H_7F_3N_4$ (240.19): C, 50.00; H, 2.94; N, 23.33; F, 23.73. Found: C, 50.14; H, 2.96; N, 23.18; E, 23.84.

EXAMPLE 15

Preparation of s-tetrazine, 3-(3-chloro-p-tolyl)

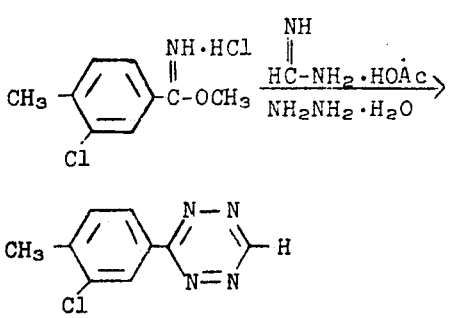

This compound is prepared as outlined in Example 1 and using the above starting material, yield 2.3 g. (26%) of dark carmine crystals, melting point 110°–111°C.

Anal. Calcd. for $C_9H_7ClN_4$ (206.65): C, 52.31; H, 3.42; N, 27.11; Cl, 17.16. Found: C, 52.44; H, 3.53; N, 26.72; Cl, 17.25.

EXAMPLE 16

Preparation of s-tetrazine, 3-(3,4-xylyl)

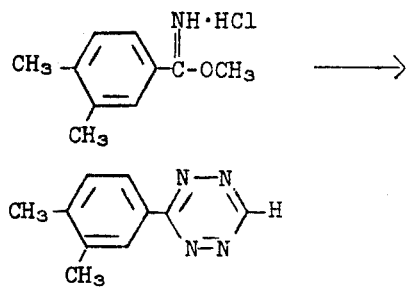

This tetrazine is obtained as a dark cherry powder, using the procedure of Example 1 and the above starting material, yield 2.9 g. (20.8%), melting point 80°–83°C.

Anal. Calcd. for $C_{10}H_{10}N_4$ (186.21): C, 64.50; H, 5.41; N, 30.09. Found: C, 64.45; H, 5.41; N, 30.05.

EXAMPLE 17

Preparation of s-tetrazine, 3-(3,4-dimethoxyphenyl)

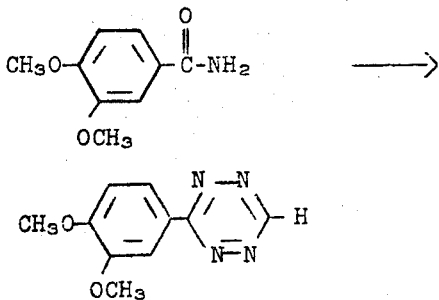

This bright red tetrazine is prepared by the procedure outlined in Example 8 and the above starting material, Yield 2.5 g. (15.6%), melting point 185°–187°C.

Anal. Calcd. for $C_{10}H_{10}N_4O_2$ (218.21): C, 55.04; H, 4.62; N, 25.68. Found: C, 54.66; H, 4.73; N, 25.97.

EXAMPLE 18

Preparation of s-tetrazine, 3-(p-methoxyphenyl)

This compound is prepared as outlined in Example 1, using as starting material methyl p-methoxyiminobenzoate hydrochloride, yield 1.6 g. (14.1%), melting point 152°–154°C.

Anal. Calcd. for $C_9H_8N_4O$ (188.18): C, 57.44; H, 4.28; N, 29.77. Found: C, 57.08; H, 4.45; N, 29.39.

EXAMPLE 19

Preparation of s-tetrazine, 3-(m-chlorophenyl

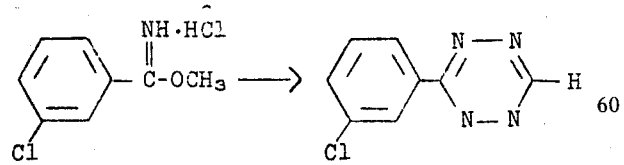

This compound is prepared by the procedure of Example 7, yield 2.1 g. (14.3%), melting point 73°–74°C.

Anal. Calcd. for $C_8H_5ClN_4$ (192.7): C, 49.88; H, 2.62; N, 29.09; Cl, 18.41. Found: C, 49.68; H, 2.64; N, 29.10; Cl, 18.52.

EXAMPLE 20

Preparation of s-tetrazine, 3-(p-tolyl)

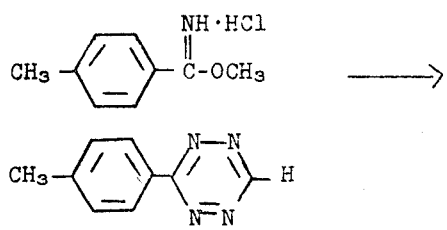

This material is synthesized according to the procedure of Example 7, yield 4.1 g. (38%), melting point 79°–81°C.

EXAMPLE 21

Preparation of s-tetrazine, 3-(3,5-xylyl)

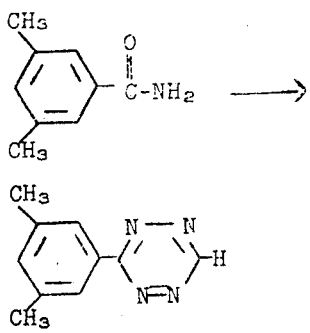

The compound is prepared according to the method of Example 8, yield 3.5 g. (14%), melting point 93°–95°C.

Anal. Calcd. for $C_{10}H_{10}N_4$ (186.21): C, 64.50; H, 5.41; N, 30.09. Found: C, 64.16; H, 5.31; N, 29.65.

EXAMPLE 22

Preparation of s-tetrazine, 3-methyl-6-(3,4-xylyl)

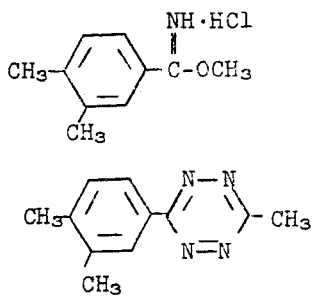

The compound is prepared as outlined in Example 2, yield 3.0 g. (22%), melting point 75°–77°C.

Anal. Calcd. for $C_{11}H_{12}N_4$ (200.24): C, 65.98; H, 6.04; N, 27.98. Found: C, 66.12; H, 6.09; N, 28.15.

EXAMPLE 23

Preparation of s-tetrazine, 3-(m-chlorophenyl)-6-methyl

This tetrazine is prepared as outlined in Example 2 and using as starting material methyl m-chloroiminobenzoate hydrochloride yield 2.2 g. (28%), melting point 79°–81°C.

EXAMPLE 24

Preparation of s-tetrazine, 3-(p-tert-butylphenyl)

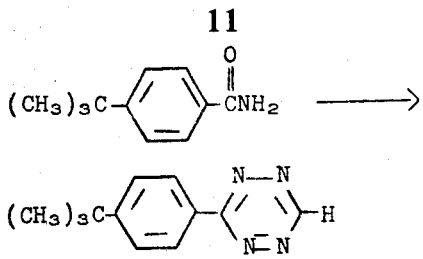

This material is obtained by following the procedure in Example 8, yield 7.1 g. (30.9%), melting point 75°–78°C.

Anal. Calcd. for $C_{12}H_{14}N_4$ (214.26): C, 67.26; H, 6.59; N, 26.15. Found: C, 67.08; H, 6.66; N, 25.76.

EXAMPLE 25

Preparation of s-tetrazine,
3-(p-tert-butylphenyl)-6-methyl

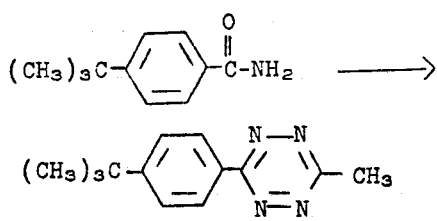

This compound is obtained by a procedure analogous to that in Example 8, yield 3.1 g. (13.8%), melting point 64°–68°C.

Anal. Calcd. for $C_{13}H_{16}N_4$ (228.29): C, 68.39; H, 7.07; N, 24.54. Found: C, 68.81; H, 7.36; N, 24.76.

EXAMPLE 26

Preparation of s-tetrazine, 3-(m-bromophenyl)

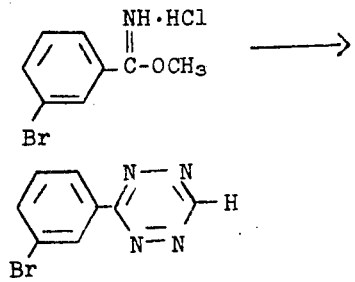

This material is obtained by following a procedure analogous to that described in Example 7, yield 1.2 g. (7.5%), melting point 89°–92°C.

Anal. Calcd. for $C_8H_5BrN_4$ (237.07): C, 40.53; H, 2.13 N, 23.63; Br, 33.71. Found: C, 40.72; H, 2.31; N, 23.61; Br, 33.42.

EXAMPLE 27

Preparation of s-tetrazine,
3-(m-bromophenyl)-6-methyl

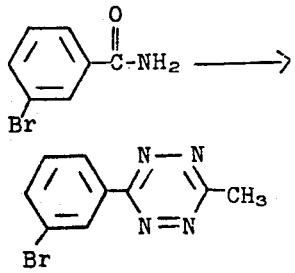

The material is obtained by using a procedure analogous to that described in Example 8, yield 2.3 g. (25%), melting point 97°–99°C.

Anal. Calcd. for $C_9H_7BrN_4$ (251.09): C, 43.05; H, 2,81; N, 22.31; Br, 31.83. Found: C, 42.84; H, 2.87; N, 22.36; Br, 32.17.

EXAMPLE 28

Preparation of s-tetrazine, 3-(p-bromophenyl)

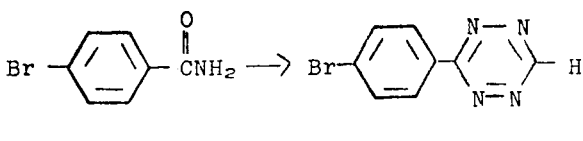

This compound is produced by the synthetic method described in Example 8, yield 2.95 g. (18.3%), melting point 175°–177°C.

Anal. Calcd. for $C_8H_5BrN_4$ (237.07): C, 40.53; H, 2.13 N, 23.63; Br, 33.71. Found: C, 40.53; H, 2.05; N, 23.60; Br, 34.04.

EXAMPLE 29

Preparation of s-tetrazine,
3-(p-bromophenyl)-6-methyl

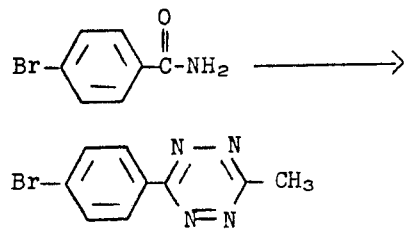

This compound is obtained using the method described in Example 8, Yield 2.6 g. (28%), melting point 150°–152°C.

Anal. Calcd. for $C_9H_7BrN_4$ (251.09): C, 43.05; H, 2.81; N, 22.31; Br, 31.83. Found: C, 42.74; H, 2.85 N, 22.35; Br, 32.24.

EXAMPLE 30

Preparation of s-tetrazine, 3-(m-iodophenyl)

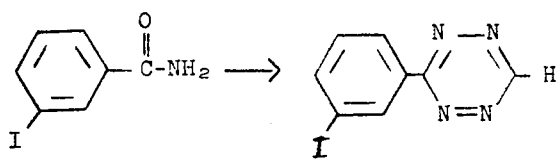

This tetrazine is obtained as outlined in Example 8, Yield 1.6 g. (9.3%), melting point 105°–107°C.

Anal. Calcd. for $C_8H_5IN_4$ (284.06) C, 33.82; H, 1.77; N, 19.72; I, 44.68. Found: C, 34.29; H, 1.88; N, 20.20; I 44.84.

EXAMPLE 31

Preparation of s-tetrazine, 3-(m iodophenyl)-6-methyl

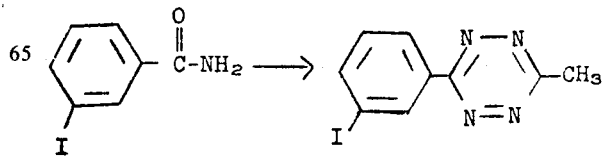

This compound is obtained as that outlined in Example 8, yield 2.3 g. (11.6%), melting point 112°–115°C.

Anal. Calcd. for C₉H₇IN₄ (298.08): C, 36.26; H, 2.37; N, 18.80; I, 42.58. Found: C, 36.42; H, 2.44; N, 18.64; I, 42.95.

EXAMPLE 32

Preparation of s-tetrazine, 3-(p-iodophenyl)

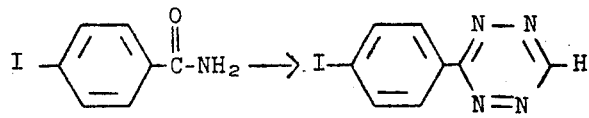

This material is obtained by the procedure outlined in Example 8, yield 320 mg. (3.2%), melting point 168°–171°C.

Anal. Calcd. for C₈H₅IN₄ (284.06): C, 33.82; H, 1.77; N, 19.72; I, 44.68. Found: C, 33.85; H, 1.99; N, 19.60; I, 44.63.

EXAMPLE 33

Preparation of s-tetrazine, 3-(p-iodophenyl)-6-methyl

This material is prepared as outlined in Example 8, using as starting material p-iodobenzamide, yield 1.8 g. (8.3%), melting point 168°–170°C.

Anal. Calcd. for C₉H₇IN₄ (298.08): C, 36.26; H, 2.37; N, 18.80; I, 42.08. Found: C, 36.42; H, 2.45; N, 18.60; I. 42.44.

EXAMPLE 34

Preparation of s-tetrazine, 3-o-tolyl o-Toluamide and methyl fluorosulfonate are allowed to react as outlined in Example 7 with the following adjustments. Chloroform is used as the solvent in place methylene chloride and the suspension is refluxed from 5 -14 hours. After cooling, the remainder of the sequence in Example 7 is resumed, yield 6% of product as dark purple oil.

Anal. Calcd. for C₉H₈N₄ (172.18): C, 62.78; H, 4.68; N, 32.54. Found: C, 62.41; H, 4.73; N, 32.23.

EXAMPLE 35

Preparation of s-tetrazine, 3-(o-fluorophenyl)

o-Fluorobenzamide and methyl fluorosulfonate are allowed to react as described in Example 34, yield 16% of product, melting point 36°–38°C.

Anal. Calcd. for C₈H₅FH₄ (176.15): C, 54.54; H, 2.86; N, 31.81; F, 10.79. Found: C, 54.48; H, 3.05; N, 31.58; F, 10.30.

EXAMPLE 36

Preparation of s-tetrazine, 3-(o-chlorophenyl)

o-Chlorobenzamide and methyl fluorosulfonate is treated as outlined in Example 34, yield 1.2%, melting point 48°–50°C.

Anal. Calcd. for C, 49.88; H, 2.62; N, 29.09; Cl, 18.41. Found: C, 49.83; H, 2.66; N, 29.07; Cl, 18.69.

EXAMPLE 37

Preparation of s-tetrazine, 3-(o-fluorophenyl)-6-methyl o-Fluorobenzamide and methyl fluorosulfonate were treated as described in Example 34, yield of product 11%, melting point 48°–50°C.

Anal. Calcd. for C, 56.84; H, 3.71; N, 29.46; F. 9.99. Found: C, 57.05; H, 3.76; N, 29.56; F, 9.77.

EXAMPLE 38

Preparation of hard shell capsules containing 3-phenyl-s-tetrazine

|  | Per 1,000 Capsules g. |
|---|---|
| 3-phenyl-s-tetrazine | 300.00 |
| Lactose | 1350.0 |
| Magnesium stearate | 15.0 |

The ingredients are blended together. The mixture is used to fill hard shell capsules of a suitable size each containing 300 mg. of active component.

EXAMPLE 39

Preparation of Tablet Compositions Containing 3-(p-Chlorophenyl)-s-tetrazine

|  | Per 1,000 Tablets g. |
|---|---|
| 3-(p-chlorophenyl)-s-tetrazine | 200.0 |
| Corn starch U.S.P. | 600.0 |
| Dibasic Calcium Phosphate | 4300.0 |
| Magnesium Stearate | 1200.0 |

The ingredients are thoroughly mixed and incorporated into a standard pharmaceutical tablet. Each tablet contains 200 mg. of therapeutic component.

We claim:

1. A method of treating inflammation and pain in a warm-blooded animal which comprises administering to said warm-blooded animal an amount effective as an anti-inflammatory and anti-pain agent of a phenyltetrazine of the formula:

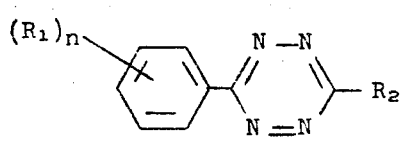

wherein R₁ is lower alkyl, halogen, hydroxy, lower alkoxy or trifluoromethyl; R₂ is hydrogen or methyl and n is 0, 1 or 2 in association with a pharmaceutically acceptable carrier.

2. A method in accordance with claim 1, in which the daily dosage of phenyltetrazine is from about 10 to 75 milligrams per kilogram of body weight of warm-blooded animal.

3. A method in accordance with claim 1, wherein the phenyltetrazine is 3-phenyl-s-tetrazine.

4. A method in accordance with claim 1, wherein the phenyltetrazine is 3-p-chlorophenyl)-s-tetrazine.

5. A method in accordance with claim 1, wherein the phenyltetrazine is 3-p-tolyl-s-tetrazine.

6. A method in accordance with claim 1, wherein the phenyltetrazine is 3-(p-fluorophenyl)-s-tetrazine.

7. A method in accordance with claim 1, wherein the phenyltetrazine is 3-methyl-6-p-tolyl-s-tetrazine.

8. A method in accordance with claim 1, wherein the phenyltetrazine is 3-(α, α, α-trifluoro-m-tolyl)-s-tetrazine.

9. A pharmaceutical tablet or capsule comprising a pharmaceutical carrier annd an anti-inflammatory or anti-pain effectice non-toxic amount within the range from about 0.2 grams to 2.0 grams of a phenyltetrazine of the formula:
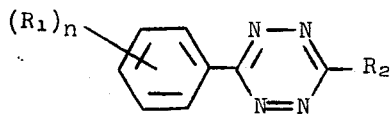
wherein $R_1$ is lower alkyl, halogen, hydroxy, lower alkoxy or trifluoromethyl; $R_2$ is hydrogen or methyl and $n$ is 0, 1 or 2.
10. The thereapeutic composition in accordance with claim 9, wherein the phenyltetrazine is 3-phenyl-s-tetrazine.
* * * * *